United States Patent
Guyer et al.

(10) Patent No.: US 11,953,115 B2
(45) Date of Patent: Apr. 9, 2024

(54) METHOD AND ACTUATOR FOR DETECTING BLOCKING OF CONTROL VALVE REGULATING FLOW OF FLUID

(71) Applicant: BELIMO HOLDING AG, Hinwil (CH)

(72) Inventors: Paul Guyer, Dürnten (CH); Daniel Aeberli, Balterswil (CH)

(73) Assignee: BELIMO HOLDING AG, Hinwil (CH)

( * ) Notice: Subject to any disclaimer, the term of this patent is extended or adjusted under 35 U.S.C. 154(b) by 319 days.

(21) Appl. No.: 17/430,059

(22) PCT Filed: Feb. 11, 2020

(86) PCT No.: PCT/EP2020/053457
§ 371 (c)(1),
(2) Date: Aug. 11, 2021

(87) PCT Pub. No.: WO2020/187486
PCT Pub. Date: Sep. 24, 2020

(65) Prior Publication Data
US 2022/0136616 A1    May 5, 2022

(30) Foreign Application Priority Data
Mar. 18, 2019 (CH) .......................... 338/19

(51) Int. Cl.
*F16K 31/04* (2006.01)
*F16K 37/00* (2006.01)
(Continued)

(52) U.S. Cl.
CPC ........ *F16K 31/046* (2013.01); *F16K 37/0041* (2013.01); *F24F 11/49* (2018.01);
(Continued)

(58) Field of Classification Search
CPC ..................................................... F16K 31/046
See application file for complete search history.

(56) References Cited

U.S. PATENT DOCUMENTS 4,671,166 A * 6/1987 Glaze .................... B64C 13/505
244/233
5,549,137 A * 8/1996 Lenz ....................... G05D 7/005
137/86
(Continued)

FOREIGN PATENT DOCUMENTS

JP    H10-299930 A    11/1998
WO    2017/119832 A1    7/2017

OTHER PUBLICATIONS

European Search Report for CH 3382019 dated Jul. 16, 2019.
International Search Report for PCT/EP2020/053457 dated Jun. 19, 2020.

*Primary Examiner* — Nathan L Laughlin
(74) *Attorney, Agent, or Firm* — Sughrue Mion, PLLC

(57) ABSTRACT

A method for operating a control valve using an HVAC actuator is described, the method comprises a circuit of the HVAC actuator executing the steps of: monitoring (S1) a rotation angle ($\phi$) associated with a drive torque ($M_{drive}$) applied by the HVAC actuator for moving the valve member; detecting (S2) a blocking of the control valve, if the applied drive torque ($M_{drive}$) effects a change of the rotation angle ($\Delta\phi$) which is smaller than a threshold angle ($\phi_{th}$); upon detection of the blocking, controlling the HVAC actuator to repeatedly change the applied drive torque ($M_{drive}$) between a first torque value (M1) and a second torque value (M2); and controlling the HVAC actuator to periodically modulate (S4) the first torque value (M1) between a third torque value and a fourth torque.

15 Claims, 9 Drawing Sheets

(51) Int. Cl.
*F24F 11/49* (2018.01)
*F24F 11/63* (2018.01)
*F24F 11/84* (2018.01)
*G05B 19/042* (2006.01)

(52) U.S. Cl.
CPC .............. *F24F 11/63* (2018.01); *F24F 11/84* (2018.01); *G05B 19/042* (2013.01); *G05B 2219/2614* (2013.01)

(56) References Cited

U.S. PATENT DOCUMENTS

| | | | |
|---|---|---|---|
| 6,237,324 B1 * | 5/2001 | Smith | F02C 9/263 60/734 |
| 2007/0102660 A1 | 5/2007 | Kouzu et al. | |
| 2011/0042593 A1 | 2/2011 | Wilby | |
| 2012/0001105 A1 | 1/2012 | Hayashi et al. | |
| 2016/0270748 A1 * | 9/2016 | Garlow | A61B 6/4435 |

* cited by examiner

METHOD AND ACTUATOR FOR DETECTING BLOCKING OF CONTROL VALVE REGULATING FLOW OF FLUID

CROSS-REFERENCE TO RELATED APPLICATIONS

This application is a National Stage of International Application No. PCT/EP2020/053457 filed Feb. 11, 2020, which claims priority under U.S.C. § 119(a) to Swiss Patent Application No. 00338/19 filed on Mar. 18, 2019, the entire contents of each of which being herein incorporated by reference in their entireties.

TECHNICAL FIELD

The invention relates to a method for operating a control valve using an HVAC actuator and to an HVAC actuator for moving a valve member of a control valve.

BACKGROUND OF THE INVENTION

Nowadays HVAC (Heating, Ventilation and Air Conditioning) systems usually involve a plurality of control valves which are used to regulate the fluid flow into different zones and/or spaces of the HVAC system. Precision in controlling the fluid flow by means of the control valves plays an important role both with respect to efficiency and accuracy in providing the desired conditions in the HVAC system.

The control valves are usually operated using HVAC actuators which are mounted on the control valves. A driving force or a driving torque, respectively, for precisely moving a valve member of a respective control valve is typically provided by an electric motor of the HVAC actuator.

In operation, a failure of a control valve can adversely affect regulation of the HVAC system. Furthermore, failure of the control valve may effect malfunctioning of the involved HVAC actuator. For example, a blocking of the control valve or the valve member, respectively, entails the risk of harming the HVAC actuator due to the electric motor trying to apply a too large torque which leads to overheating and, eventually to damaging of the HVAC actuator.

Several schemes have been proposed to resolve failures of the control valve and, in particular, blocking of the valve member damaging the HVAC actuator. For example, HVAC actuators with driving torque ranges largely over dimensioned with respect to the intended purpose of use have been applied. However, the schemes in the prior art often suffer from low efficiency and/or insufficient protection of the HVAC actuator from damage.

SUMMARY OF THE INVENTION

It is an object of the invention to provide a method for operating a control valve using an HVAC actuator and an HVAC actuator for moving a valve member of a control valve which at least partially improves the prior art.

According to the present invention, this object is achieved by the features of the independent claims. In addition, further advantageous embodiments follow from the dependent claims and the description.

According to an aspect of the invention, the object is particularly achieved by a method for operating a control valve using an HVAC actuator, the control valve comprising a valve member for regulating a fluid flow through the control valve, the method comprising a circuit of the HVAC actuator executing the steps of: monitoring a rotation angle associated with a drive torque applied by the HVAC actuator for moving the valve member; detecting a blocking of the control valve, if the applied drive torque effects a change of the rotation angle which is smaller than a threshold angle; upon detection of the blocking, controlling the HVAC actuator to repeatedly change the applied drive torque between a first torque value and a second torque value smaller than the first torque value; and controlling the HVAC actuator to periodically modulate the first torque value between a third torque value and a fourth torque value smaller than the third torque value.

The valve member of the control valve may be a rotating valve member, such as a disc of a butterfly valve, a ball of a ball valve etc. In other embodiments, the valve member of the control valve is a gate or a wedge of a gate valve. In an embodiment, the valve member comprises a valve stem and/or plug of a globe valve. The HVAC actuator usually comprises an electric motor configured to generate a drive torque for moving the valve member as reflected by a rotation angle of the rotor of the electric motor. Depending on embodiment and/or configuration, the drive torque is used to rotate a rotatable valve member or to move a linear valve member, using suitable gear drives and/or other mechanical coupling systems.

A blocking of the control valve or the valve member, respectively, is detected, for example, if the applied drive torque does not lead to a significant movement of the valve member. Accordingly, the circuit of the HVAC actuator is configured to detect a blocking of the control valve by defining a threshold angle, below which a change of the rotation angle effected by an applied drive torque indicates blocking of the control valve. In some embodiments, the circuit of the HVAC actuator is configured to define a test drive torque with a corresponding rotation angle and to detect a blocking of the control valve, if application of the test drive torque effects a change of the rotation angle smaller than the corresponding rotation angle. Blocking of the control valve or the valve member, respectively, may be due to too high resistance of sealing elements of the control valve, dirt, long standing time of the control valve etc.

By increasing the applied drive torque to a first torque value, the cause of the blocking, for example dirt, can be overcome. By repeatedly changing the applied drive torque between a first, large torque value and a second torque value smaller than the first torque value, the risk of harming the HVAC actuator can be decreased or avoided. Additionally modulating the first torque value allows to generate an effective momentum or angular momentum, respectively, which advantageously increases the efficiency in releasing the blocking of the control valve or the valve member, respectively. Therefore, an overload procedure for releasing a blocking of the control valve comprising a first oscillation cycle, with a repeated change of the applied drive torque between the first and second torque value, and a second oscillation cycle, with a periodic modulation of the first torque value between a third and fourth torque value, can be provided. Due to the higher efficiency of releasing the blocking of the control valve, the magnitude of the first torque value can be reduced. Therefore, HVAC actuators with smaller ranges of the drive torque can be used. In particular, the use of HVAC actuators with largely over dimensioned ranges of the drive torque with respect to the intended purpose of use can be avoided.

In an embodiment, the fourth torque value is larger than the second torque value.

In an embodiment, the third torque value is equal to the first torque value. Alternatively, the third torque value may be larger or smaller than the first torque value. In some embodiments, the third torque value is larger and the fourth torque value is smaller than the first torque value, wherein the first torque value may be the mean of the third torque value and the fourth torque value. In some embodiments, the first torque value is equal to the fourth torque value.

In an embodiment, the first torque value or the third torque value is equal to a maximally applicable drive torque of the HVAC actuator.

The person skilled in the art understands that the applied drive torque may not reach exactly the maximally applicable drive torque for every increase of the applied drive torque to the first or third torque value. In particular, the applied drive torque may be increased to the first torque value and repeatedly changed between the first torque value and second torque value within the tolerances known to the person skilled in the art. The modulation of the first torque value between the third torque value and the fourth torque value may accordingly occur within the tolerances known to the person skilled in the art.

In an embodiment, the second torque value is equal to a holding torque value required to keep the valve member at a specific position.

In an embodiment, the circuit controls the HVAC actuator to modulate the first torque value by a rectangular modulation signal.

In an embodiment, the duty cycle of the rectangular modulation signal is equal to 0.5. Alternatively, the duty cycle of the rectangular modulation signal deviates from 0.5.

In an embodiment, the circuit controls the HVAC actuator to modulate the first torque value by a triangular or a sawtooth modulation signal.

In an embodiment, the circuit controls the HVAC actuator to deactivate periodic modulation of the first torque value within a first range of the rotation angle from a closed position of the control valve.

By deactivating the periodic modulation of the first torque value near the closed position of the control valve, generation of momentum or angular momentum, respectively, detrimental to sealing elements of the control valve can be avoided. In particular, detrimental "hammering" of the valve member into the sealing elements due to modulation of the first torque value while closing the control valve can be avoided. In some embodiments, the first range of the rotation angle from a closed position of the control valve within which the periodic modulation is deactivated, is around 5% of the full moving range of the valve member.

In an embodiment, the circuit controls the HVAC actuator to deactivate periodic modulation of the first torque value within a second range of the rotation angle up to a fully open position of the control valve.

In some embodiments, the second range of the rotation angle from a fully open position of the control valve within which the periodic modulation is deactivated, is around 5% of the full moving range of the valve member.

In an embodiment, the circuit controls the HVAC actuator to terminate periodic modulation of the first torque value, if the change of the rotation angle effected by the applied drive torque exceeds the threshold angle.

The rotation angle exceeding the threshold angle defined by the circuit of the control valve may be indicative of releasing of the blocking of the control valve. Therefore, the circuit of the HVAC actuator may terminate periodic modulation of the first torque value, if a release of the blocking of the control valve is detected. After termination of the periodic modulation of the first torque value, normal operation of the control valve may be resumed.

In an embodiment, the circuit controls the HVAC actuator to interrupt the repeated changing of the applied drive torque, between the first torque value and the second torque value, after a defined number of increases of the applied drive torque to the first torque value, if the blocking of the control valve persists, and to return to the second torque value.

The circuit advantageously sets the defined number of increases of the applied drive torque to the first torque value such that harming of HVAC actuator can be avoided. Thus, the overload procedure may be limited in order to minimize the risk of harming the HVAC actuator in case the blocking of the control valve persists.

In an embodiment, the circuit controls the HVAC actuator to repeatedly change the applied drive torque between the first torque value and the second torque value with a first frequency and to modulate the first torque value between the third torque value and the fourth torque value with a second frequency larger than the first frequency.

The repeated change of the applied drive torque between the first torque value and the second torque value may therefore be a slow, but large variation of the applied drive torque which may be superimposed by a fast, but small modulation of the first drive torque value between the third torque value and the fourth torque value. In some embodiments, the second frequency of the modulation of the first torque value is at least 10 times larger than the first frequency of the slow variation of the applied drive torque between the first torque value and the second torque value. In some embodiments, the second frequency is around 100 times larger than the first frequency.

According to a further aspect, the present invention is also directed to an HVAC actuator for moving a valve member of a control valve to regulate a fluid flow through the control valve, the HVAC actuator comprising a circuit configured to: monitor a rotation angle associated with a drive torque applied by the HVAC actuator for moving the valve member; detect a blocking of the control valve, if the applied drive torque effects a change of the rotation angle which is smaller than a threshold angle; upon detection of the blocking, control the HVAC actuator to repeatedly change the applied drive torque between a first torque value and a second torque value smaller than the first torque value; and to control the HVAC actuator to periodically modulate the first torque value between a third torque value and a fourth torque value smaller than the third torque value.

The circuit of the HVAC actuator may comprise components such as one or more microcontrollers, ASICs, microprocessors or other electronic circuitry.

According to a further aspect, the present invention is also directed to a computer program product comprising a non-transitory computer-readable medium having stored thereon computer program code configured to control a circuit of an HVAC actuator such that the circuit executes the steps of: monitoring a rotation angle associated with a drive torque applied by the HVAC actuator for moving a valve member of a control valve; detecting a blocking of the control valve, if the applied drive torque effects a change of the rotation angle which is smaller than a threshold angle; upon detection of the blocking, controlling the HVAC actuator to repeatedly change the applied drive torque between a first torque value and a second torque value smaller than the first torque value; and controlling the HVAC actuator to periodically modulate the first torque value between a third torque value and a fourth torque value smaller than the third torque value.

BRIEF DESCRIPTION OF THE DRAWINGS

The present invention will be explained in more detail, by way of example, with reference to the drawings, in which.

DESCRIPTION OF THE EMBODIMENTS

Figure 9:
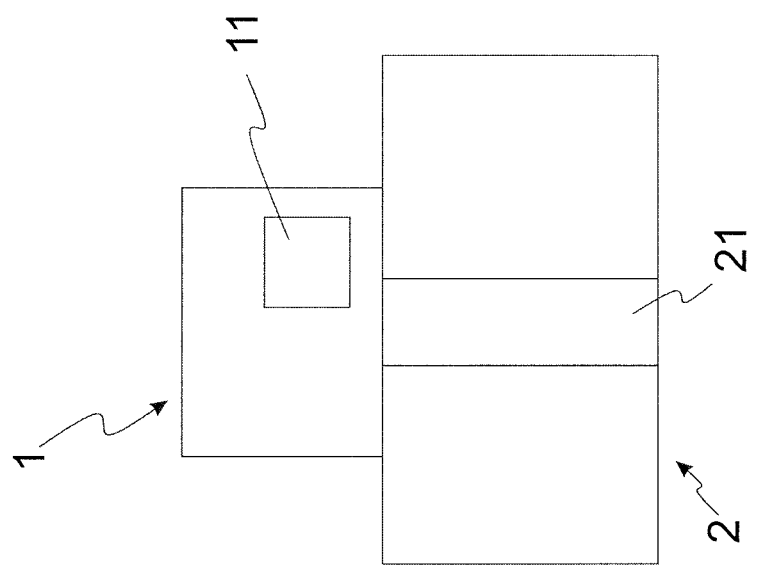
FIG. 9 shows a block diagram illustrating an HVAC actuator mounted onto a control valve.

FIG. 9 shows a block diagram illustrating an HVAC actuator 1 mounted onto a control valve 2. The HVAC actuator 1 comprises a circuit 11 configured to execute the steps of the overload procedure as described in FIGS. 2-7. Depending on the embodiment, the circuit 11 of the HVAC actuator 1 comprises components such as one or more microcontrollers, ASICs (Application Specific Integrated Circuits), (programmed) microprocessors and/or other electronic circuitry. The control valve 2 comprises a valve member 21 which is moved by the HVAC actuator 1 or an electric motor of the HVAC actuator 1, respectively. A blocking of the control valve 2 or the valve member 21, respectively, may be released by the circuit 11 of the HVAC actuator executing steps of an overload procedure, as described below in more detail.

Figure 1:
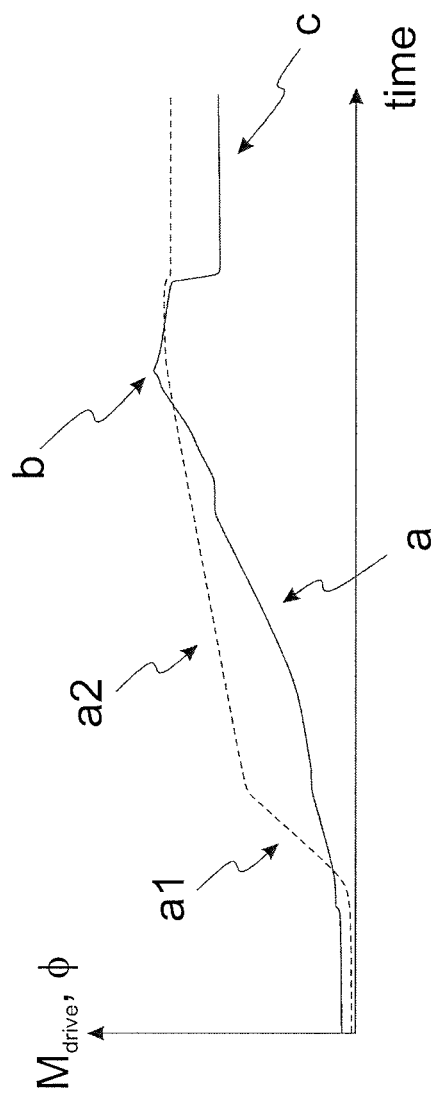
FIG. 1 shows a graph illustrating the temporal course of an applied drive torque and a rotation angle.

FIG. 1 shows a graph illustrating the temporal course of a drive torque $M_{drive}$ applied by an electric motor of the HVAC actuator 1 and an associated rotation angle $\phi$ for moving the valve member 21 of the control valve 2, if no blocking of the control valve 2 occurs. The circuit 11 monitors the rotation angle $\phi$ and controls the HVAC actuator 1 such that a required rotation angle $\phi_{req}$ is achieved by the applied drive torque $M_{drive}$. The solid curve shows the temporal course of the drive torque $M_{drive}$, whereas the dashed line shows the temporal course of the rotation angle $\phi$. In the region denoted by a, an increase of the applied drive torque $M_{drive}$ leads to a corresponding increase of the rotation angle 4. In the shown example, the valve member 21 of the control valve 2 is moved from an open position to a fully closed position. The increase of the rotation angle $\phi$ exhibits two regions a1 and a2. In region a1, the valve member 21 is moved with a high velocity which is reflected by a steep increase of the rotation angle 4. In region a2, the valve member 21 is moved into a range near a closed position of the control valve 2 where the velocity of moving the valve member 21 is lower due to one or more sealing elements of the control valve 2. This is reflected by a decrease of the slope of increase of the rotation angle $\phi$. The drive torque $M_{drive}$ is increased until point b where the drive torque $M_{drive}$ reaches a closing torque M5. After the rotation angle $\phi$ has reached a value where the control valve 2 is closed, the drive torque $M_{drive}$ assumes a holding torque in region c required to keep the valve member 21 in the closed position. For the control valve 2 not being blocked, as shown in FIG. 1, it can be recognized that a monotonous increase of the applied drive torque $M_{drive}$ leads to a monotonous increase of the rotation angle $\phi$, although the slope of the rotation angle varies for different positions of the valve member 21.

Figure 2:
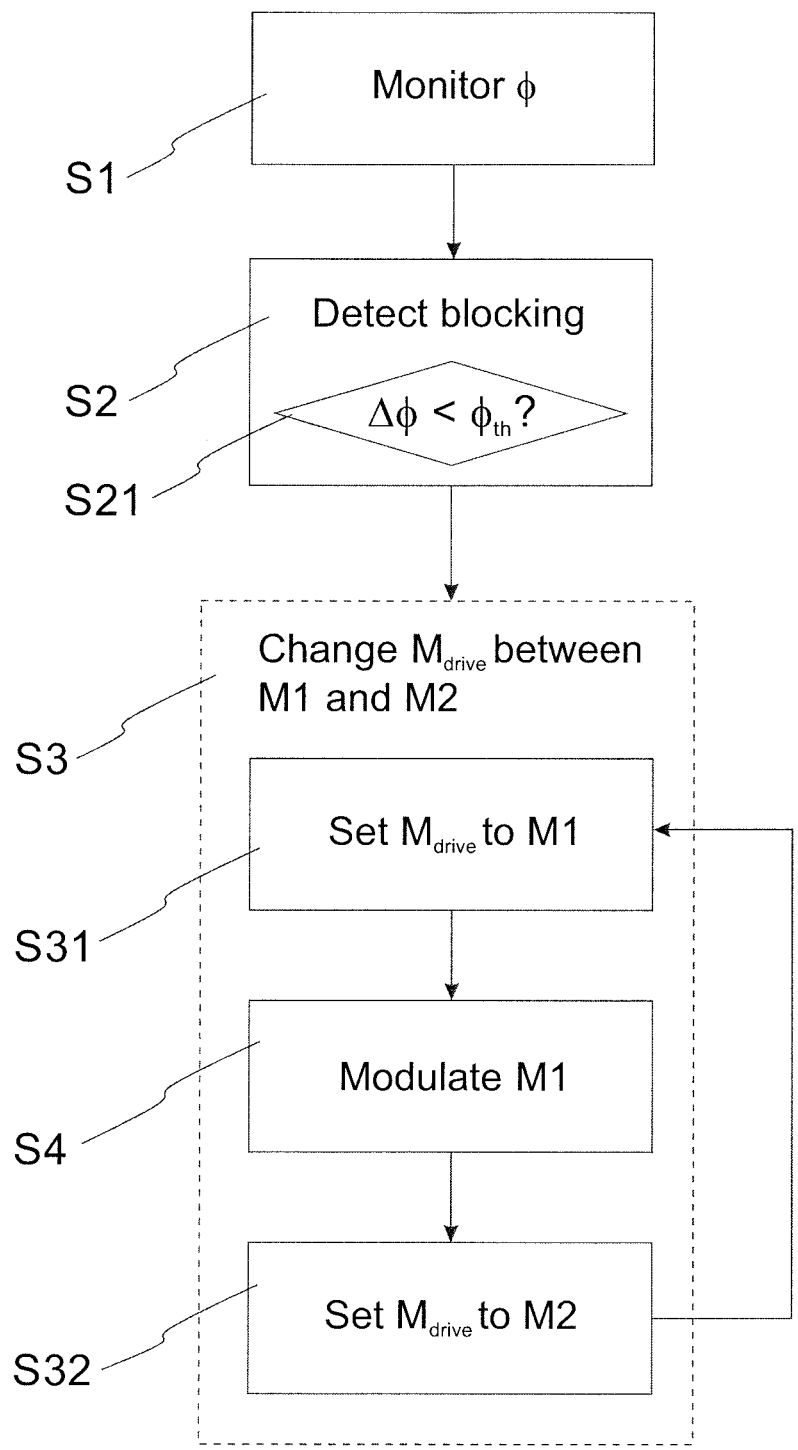
FIG. 2 shows a flow diagram illustrating an exemplary sequence of steps of monitoring a rotation angle, detecting a blocking of the control valve, and changing the applied drive torque between a first torque value and a second torque value.

FIG. 2 shows a flow diagram illustrating an exemplary sequence of steps executed by the circuit 11 of the HVAC actuator 1 for monitoring a rotation angle 4, detecting a blocking of the control valve 2, and changing the applied drive torque $M_{drive}$ between a first torque value M1 and a second torque value M2. In step S1, the rotation angle $\phi$ associated with the drive torque $M_{drive}$ applied by the HVAC actuator 1 for moving the valve member 21 is monitored. In step S2, a blocking of the control valve 2 is detected by checking the criterion $\Delta\phi < \phi_{th}$ in step S21, i.e. whether the change of the rotation angle effected by the applied drive torque $M_{drive}$ is smaller than a defined threshold angle $\phi_{th}$. The threshold angle $\phi_{th}$ may be defined for a specific test drive torque which should effect a change of the rotation angle $\Delta\phi$ to be larger than the threshold angle $\phi_{th}$, if the control valve 2 is not blocked. Therefore, a change of the rotation angle $\Delta\phi$ effected by the test drive torque smaller than the threshold angle $\phi_{th}$ is indicative of a blocking of the control valve 2. In step S3, the applied drive torque $M_{drive}$ is repeatedly changed between the first torque value M1 and the second torque value M2. The first torque value M1 may be equal to a maximally applicable drive torque of the HVAC actuator 1. The second torque value M2 may be equal to a holding torque of the HVAC actuator 1 such as to keep the valve member 21 at a specific position, e.g. at the rotation angle where the blocking has occurred. The repeated change of the drive torque $M_{drive}$ is started in step S31 by setting the drive torque $M_{drive}$ to the first torque value M1. Once the drive torque $M_{drive}$ has reached the first torque value M1, the first torque value M1 is modulated between a third torque value and a fourth torque value in step S4. As already mentioned, the drive torque $M_{drive}$ may not exactly reach the first torque value M1 before the modulation of the first torque value M1 starts. The circuit 11 of the HVAC actuator 1 may be configured to allow for a certain tolerance range for the first torque value M1 within which the applied drive torque $M_{drive}$ is considered to have reached the first torque value M1. The circuit 11 of the HVAC actuator 1 may accordingly be configured to allow for suitable tolerance ranges for the second torque value M2, the third torque value and the fourth torque value. After a defined number of periods of the modulation of the first torque value M1 has been performed, the applied drive torque $M_{drive}$ returns to the second torque value M2 in step S32. After assuming the second torque value M2 for a defined period of time, which may be equal to the period of time the applied drive torque $M_{drive}$ is set to the first torque value M1 or where modulation of the first torque value M1 is performed, respectively, the cycle is started again by the circuit 11 of the HVAC actuator 1 executing step S31. It is clear to the person skilled in the art that the cycle can also start with step S32 after a blocking of the control valve 2 is detected in step S2.

In an embodiment, the circuit 11 detects, before detecting a blocking in step S2, if a required rotation angle $\phi_{req}$ is not reached, in spite of a suitably applied drive torque $M_{drive}$. The required rotation angle $\phi_{req}$ may not be reached for example due to dirt in the control valve 2, without the control valve 2 being blocked, i.e. without fulfilling the criterion of step S21. In particular, the movement of the valve member 21 may be slowed down, as reflected by the rotation angle not reaching the required value $\phi_{req}$. In said embodiment, the circuit 11 controls the HVAC actuator 1 to increase the applied drive torque $M_{drive}$ to M1 in order to overcome the slowdown of the movement of the valve member 21, such that the required rotation angle $\phi_{req}$ may be reached again. After increasing the applied drive torque $M_{drive}$ to M1, the circuit 11 may execute step S2 in order to detect if a blocking of the control valve 2 has occurred.

Figure 3:
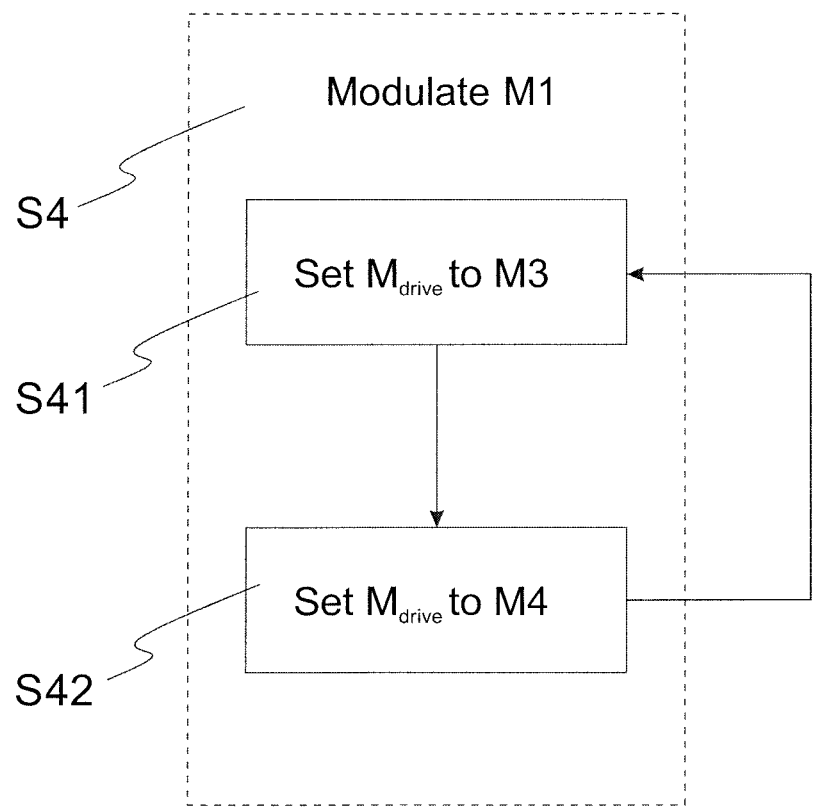
FIG. 3 shows a flow diagram illustrating an exemplary sequence of steps of modulating the first torque value.

FIG. 3 shows a flow diagram illustrating an exemplary sequence of steps executed by the circuit 11 of the HVAC actuator 1 for modulating the first torque value M1 in step S4. Modulation of the first torque value M1 is performed by alternatingly setting the drive torque $M_{drive}$ to the third torque value M3 and the fourth torque value M4 in a periodic fashion.

Figure 4:
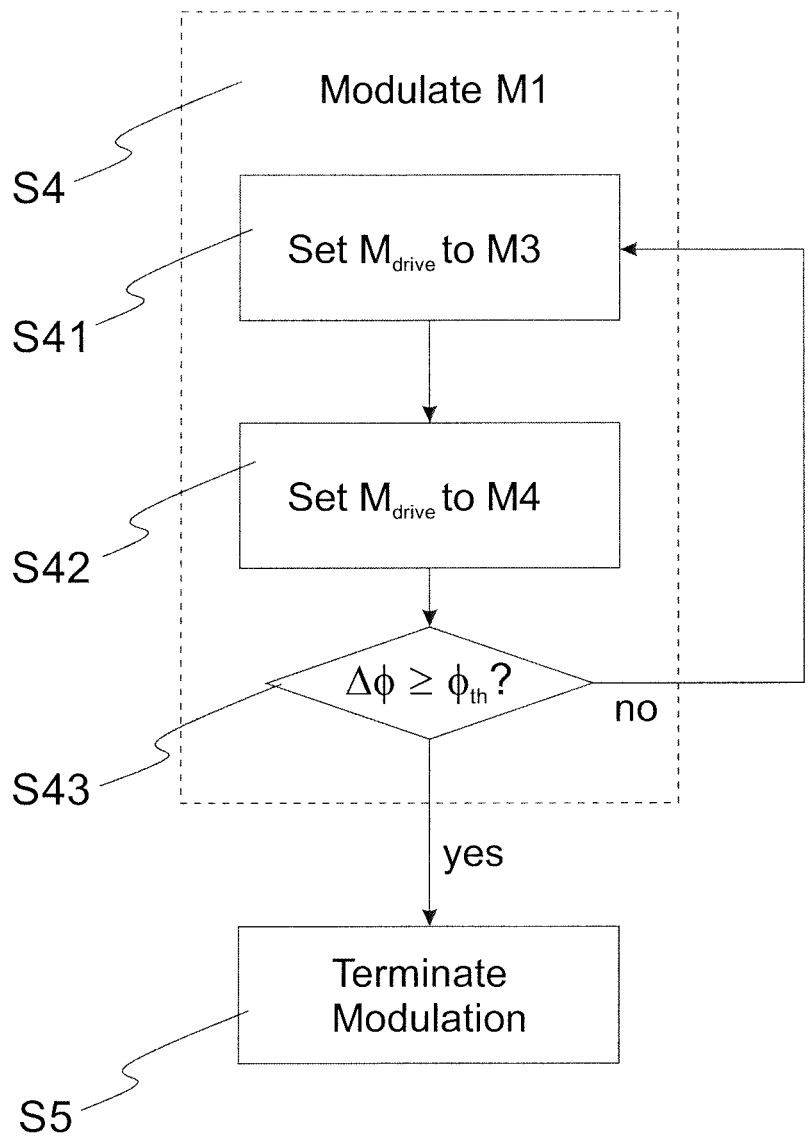
FIG. 4 shows a flow diagram illustrating an exemplary sequence of steps of modulating the first torque value, wherein the modulation is terminated, if the change of the rotation angle exceeds a threshold angle.

FIG. 4 shows a flow diagram illustrating an exemplary sequence of steps executed by the circuit 11 of the HVAC actuator 1 for modulating the first torque value M1 in step S4, wherein the modulation is terminated, if the change of the rotation angle $\Delta\phi$ exceeds the threshold angle $\phi_{th}$. A change of the rotation angle $\Delta\phi$ which exceeds the threshold angle $\phi_{th}$ is indicative of successful release of the blocking of the control valve 2. For the shown example, the circuit 11 of the HVAC actuator 1 is configured to check the criterion $\Delta\phi \geq \phi_{th}$ in step S43, after setting the drive torque $M_{drive}$ to M4. If the change of the rotation angle $\Delta\phi$ exceeds the threshold angle $\phi_{th}$, the modulation of the first torque value M1 is terminated and normal operation of the control valve 2 is resumed.

Figure 5:
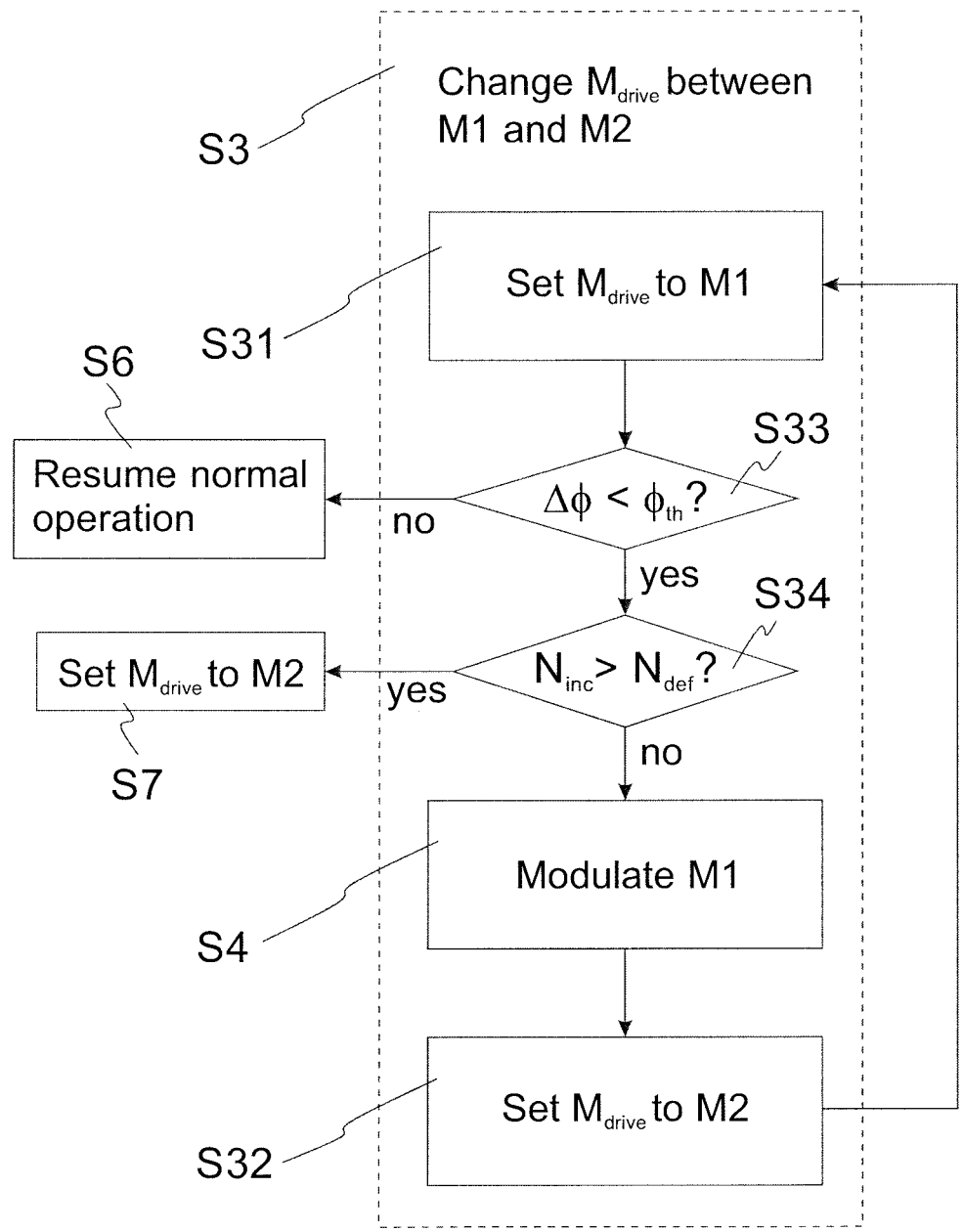
FIG. 5 shows a flow diagram illustrating an exemplary sequence of steps of changing the applied drive torque between the first torque value and the second torque value, wherein the repeated changing of the applied drive torque is interrupted after a defined number of increases of the applied drive torque to the first torque value, if the blocking of the control valve persists.

FIG. 5 shows a flow diagram illustrating an exemplary sequence of steps executed by the circuit 11 of the HVAC actuator 1 for changing the applied drive torque $M_{drive}$ between the first torque value M1 and the second torque value M2, wherein the repeated changing of the applied drive torque $M_{drive}$ is interrupted after a defined number $N_{def}$ of increases of the applied drive torque $M_{drive}$ to the first torque value M1, if the blocking of the control valve 2 persists. The circuit 11 of the HVAC actuator 1 is configured to check the criterion $\Delta\phi < \phi_{th}$ in step S33 after setting the drive torque $M_{drive}$ to M1 in step S31. If the change of the rotation angle $\Delta\phi$ exceeds the threshold angle $\phi_{th}$, the circuit 11 of the HVAC actuator 1 considers the blocking of the control valve 2 to be released and controls the HVAC actuator 1 to resume normal operation in step S6. If the blocking of the control valve 2 persists, i.e. the criterion $\Delta\phi < \phi_{th}$ is fulfilled, the circuit 11 of the HVAC actuator 1 proceeds to checking the criterion $N_{inc} > N_{def}$ in step S34, i.e. to check whether the number of increases $N_{inc}$ of the drive torque $M_{drive}$ is larger than the defined number $N_{def}$ of increases of the applied drive torque $M_{drive}$ to the first torque value M1. The HVAC actuator 1 may comprise a storage, e.g. memory, where the current number of increases of the drive torque $M_{drive}$ to the first torque value M1 is stored after step S31. If the number of increases $N_{inc}$ is larger than the defined number of increases $N_{def}$, the repeated changing of the applied drive torque $M_{drive}$ is interrupted by setting the applied drive torque $M_{drive}$ to the second torque value M2 in step S7. After a certain waiting time, the overload procedure including the repeated change of the applied drive torque $M_{drive}$ between the first torque value M1 and the second torque value M2 may be resumed. In case step S34 results in the criterion $N_{inc} > N_{def}$ to be not fulfilled, i.e. the number of increases $N_{inc}$ not exceeding the defined number of increases $N_{def}$, the circuit 11 of the HVAC actuator 1 proceeds with modulation of the first torque value M1 in step S4.

Figure 6:
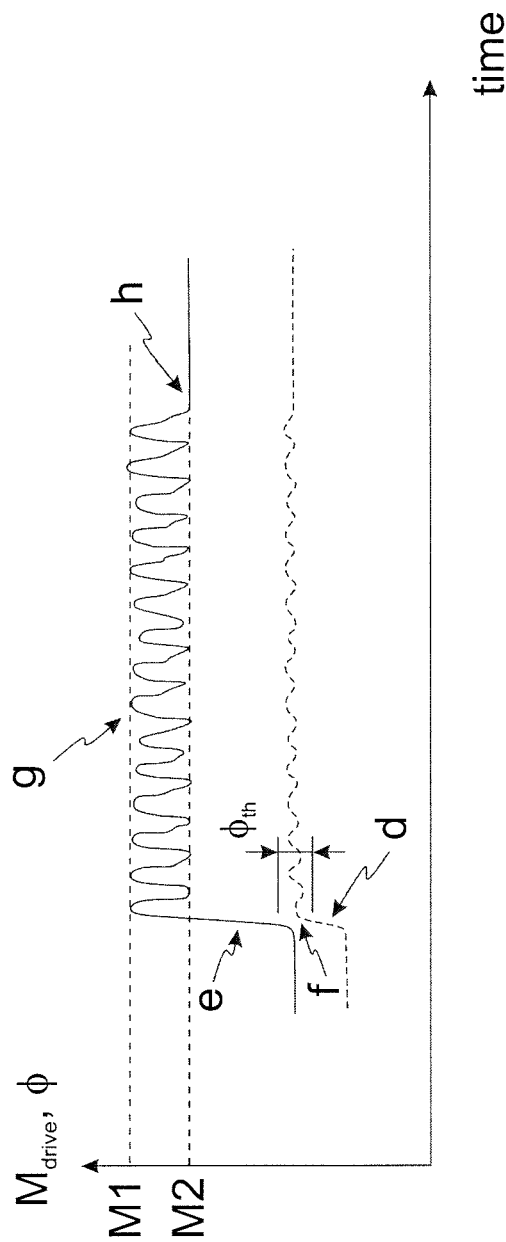
FIG. 6 shows a graph illustrating the temporal course of the applied drive torque and the rotation angle where an overload procedure is applied to a blocked control valve.

FIG. 6 shows a graph illustrating the temporal course of the applied drive torque $M_{drive}$ and the rotation angle $\phi$ where an overload procedure is applied to a blocked control valve 2. The applied drive torque $M_{drive}$ is depicted by the solid curve whereas the rotation angle $\phi$ is depicted by the dashed curve. In region d, the valve member 21 is not blocked and the rotation angle $\phi$ responds to the applied drive torque $M_{drive}$, i.e. the valve member 21 is moved by the rotation angle $\phi$ in accordance to the applied drive torque $M_{drive}$. At the position denoted by f, a blocking of the control valve 2 or the valve member 21, respectively, occurs and the rotation angle $\phi$ does not respond anymore to the applied drive torque $M_{drive}$, and starts to level out. The circuit 11 of the HVAC actuator 1 detects the blocking due to the applied drive torque effecting only a change of the rotation angle $\phi$ being smaller than the threshold angle $\phi_{th}$ and starts the overload procedure by increasing the drive torque $M_{drive}$ to the first drive torque value M1 in region e. After reaching the first drive torque value M1, the applied drive torque $M_{drive}$ is repeatedly changed between the first drive torque value M1 and the second drive torque value M2 as denoted by g. It can be recognized that the applied drive torque $M_{drive}$ reaches the first drive torque value M1 and/or the second drive torque value M2 for each peak and/or dip within certain tolerances as mentioned earlier. Furthermore, the repeated change of the applied drive torque $M_{drive}$ is not strictly periodic, as the shape of the peaks and/or dips may vary to a certain extent. At the position h, the repeated change of the applied drive torque $M_{drive}$ is interrupted, due to the number of increases of the applied drive torque $M_{drive}$ to the first torque value M1 exceeding a defined number of increases and persisting of the blocking of the control valve 2. The applied drive torque $M_{drive}$ is returned to the second torque value M2, which may be the holding torque required to keep the valve member 21 at the current position. The first torque value M1 may be equal to the maximally applicable drive torque of the HVAC actuator 1. The second torque value M2 is smaller than the first torque value M1. A modulation of the first drive torque value M1 is performed each time the applied drive torque $M_{drive}$ is increased to the first drive torque value M1. Due to the comparatively small amplitude and the larger frequency of the modulation signal with respect to the repeated change of the applied drive torque $M_{drive}$ between the first torque value M1 and the second drive torque value M2, the modulation is not shown in FIG. 6. The frequency of the modulation signal may be at least 10 times larger than the frequency of the repeated change of the applied drive torque $M_{drive}$. In some embodiments, the frequency of the modulation signal may be around 100 times larger than the frequency of the repeated change of the applied drive torque $M_{drive}$.

Figure 7:
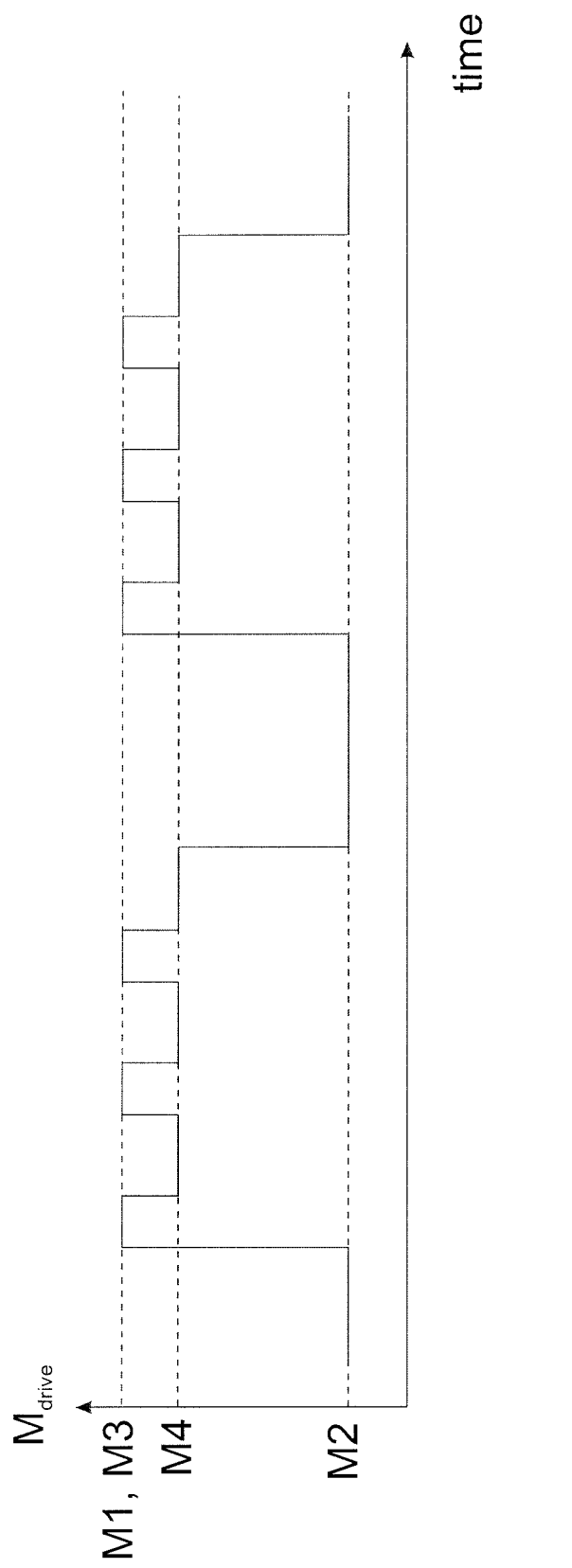
FIG. 7 shows a graph illustrating the temporal course of the applied drive torque in a range where the first drive torque value is modulated.

FIG. 7 shows a graph illustrating the temporal course of the applied drive torque $M_{drive}$ in a range where the first drive torque value M1 is periodically modulated between a third torque value M3 and a fourth torque value M4. In the shown example, the first torque value M1 is equal to the third torque value M3. In other embodiments, the first torque value M1 may be between the third torque value M3 and the fourth torque value M4. In some embodiments, the first torque value M1 may be equal to the fourth torque value M4. The fourth torque value M4 is smaller than the third torque value M3 and larger than the second torque value M2. The first torque value M1 is modulated by a rectangular modulation signal. Although not shown in the Figures, it is clear to the person skilled in the art, that a triangular or a sawtooth signal or other modulation signals known in the art can be applied correspondingly to modulate the first torque value M1. The modulation shown in FIG. 7 is superimposed to the repeated change of the applied drive torque $M_{drive}$, as shown in FIG. 6. Again, the applied drive torque $M_{drive}$ may deviate from the ideal rectangular signal as shown in FIG. 7 within tolerances known to the person skilled in the art. It can be recognized from FIG. 7, that the duty cycle of the rectangular modulation signal deviates from 0.5 in that the time where the applied drive torque $M_{drive}$ is set to the third torque value M3 or maximum oscillation torque, respectively, is smaller than the time where the applied drive torque $M_{drive}$ is set to the fourth torque value M4. The periodic modulation of the first torque value M1 as shown in FIG. 7 leads to a "hammering" effect, which is effective for releasing the blocking of the control valve 2. Furthermore, the "hammering" effect allows to reduce the time during which the applied drive torque $M_{drive}$ has to be kept at the first torque value M1 and/or the number of increases of the applied drive torque $M_{drive}$ to the first torque value M1, due to higher efficiency in releasing the blocking of the control valve 2. By reducing the time or number of increases of the applied drive torque $M_{drive}$ to the first torque value M1, the risk of harming the HVAC actuator 1 can be reduced or avoided.

Figure 8:
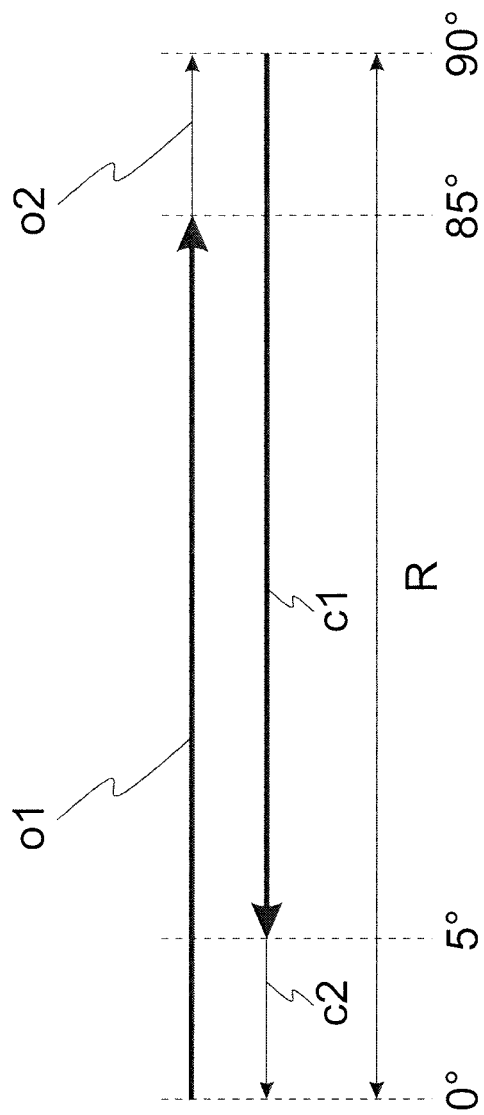
FIG. 8 shows a graph illustrating the ranges near a fully closed position and a fully open position of the control valve where periodic modulation of the first drive torque value is deactivated.

FIG. 8 shows an illustration of the ranges near a fully closed position and a fully open position of the control valve 2 where periodic modulation of the first drive torque value is deactivated. In the course of closing the control valve 2, as shown by the arrows pointing from 90° to 0°, the overload procedure or periodic modulation of the first torque value, respectively, is performed in a range c1 as shown by the bold arrow, in the case of a blocking of the control valve 2. In a first range c2 from a closed position of the control valve 2, e.g. between 0° and 5°, the overload procedure or periodic modulation of the first torque value, respectively, is deactivated, in order to avoid "hammering" into sealing elements of the control valve 2. In the course of opening the control valve 2, as shown by the arrows pointing from 0° to 90°, the overload procedure or periodic modulation of the first torque value, respectively, is performed in a range of as shown by the bold arrow, in the case of a blocking of the control valve 2. In a second range o2 up to a fully open position of the control valve 2, e.g. between 85° and 90°, the overload procedure or periodic modulation of the first torque value, respectively, is also deactivated. In ranges c2, the circuit 11 may control the HVAC actuator 1 to apply a fifth torque value M5 equal to a closing torque. The fifth torque value M5 may be smaller than the first torque value M1 and larger than the second torque value M2. The full moving range of the valve member 21 is denoted by R. The scheme may equally be applied to a rotating valve member 21 as well as to a linearly moving valve member 21 with a suitable gear drive and/or another mechanical coupling to translate the drive torque to a rotating or linear movement.

LIST OF DESIGNATIONS

1 HVAC actuator
11 Circuit
2 Control valve
21 Valve member
$M_{drive}$ Applied drive torque
M0 Drive torque applied at detection of the blocking
M1 First torque value
M2 Second torque value
M3 Third torque value
M4 Fourth torque value
M5 Fifth torque value
$\phi$ Rotation angle
$\phi_{th}$ Threshold angle
$\Delta\phi$ Change of the rotation angle
$N_{inc}$ Number of increases to the first torque value M1
$N_{def}$ Defined number of increases to the first torque value M1
c2 First range
c1 Range
o2 Second range
R Range

The invention claimed is:

1. A method for operating a control valve (2) using an HVAC actuator (1), the control valve (2) comprising a valve member (21) for regulating a fluid flow through the control valve (2), the method comprising a circuit (11) of the HVAC actuator (1) executing the steps of:
monitoring a rotation angle ($\phi$) associated with a drive torque ($M_{drive}$) applied by the HVAC actuator (1) for moving the valve member (21);
detecting a blocking of the control valve (2), if the applied drive torque ($W_{drive}$) effects a change of the rotation angle ($\Delta\phi$) which is smaller than a threshold angle ($\phi_{th}$);
upon detection of the blocking, controlling the HVAC actuator (1) to repeatedly change the applied drive torque ($M_{drive}$) between a first torque value (M1) and a second torque value (M2) smaller than the first torque value (M1); and
controlling the HVAC actuator (1) to periodically modulate the first torque value (M1) between a third torque value (M3) and a fourth torque value (M4) smaller than the third torque value (M3).

2. The method according to claim 1, wherein the fourth torque value (M4) is larger than the second torque value (M2).

3. The method according to claim 1, wherein the third torque value (M3) is equal to the first torque value (M1).

4. The method according to claim 1, wherein the first torque value (M1) or the third torque value (M3) is equal to a maximally applicable drive torque of the HVAC actuator (1).

5. The method according to claim 1, wherein the second torque value (M2) is equal to a holding torque value required to keep the valve member (21) at a specific position.

6. The method according to claim 1, wherein the circuit (11) controls the HVAC actuator (1) to modulate the first torque value (M1) by a rectangular modulation signal.

7. The method according to claim 6, wherein the duty cycle of the rectangular modulation signal is equal to 0.5 or deviates from 0.5.

8. The method according to claim 1, wherein the circuit (11) controls the HVAC actuator (1) to modulate the first torque value (M1) by a triangular or a sawtooth modulation signal.

9. The method according to claim 1, wherein the circuit (11) controls the HVAC actuator (1) to deactivate periodic modulation of the first torque value (M1) within a first range (c2) of the rotation angle ($\phi$) from a closed position of the control valve (2).

10. The method according to claim 1, wherein the circuit (11) controls the HVAC actuator (1) to deactivate periodic modulation of the first torque value (M1) within a second range (o2) of the rotation angle ($\phi$) up to a fully open position of the control valve (2).

11. The method according to claim 1, wherein the circuit (11) controls the HVAC actuator (1) to terminate periodic modulation of the first torque value (M1), if the change of the rotation angle ($\Delta\phi$) effected by the applied drive torque ($M_{drive}$) exceeds the threshold angle ($\phi_{th}$).

12. The method according to claim 1, wherein the circuit (11) controls the HVAC actuator (1) to interrupt the repeated changing of the applied drive torque ($M_{drive}$) between the first torque value (M1) and the second torque value (M2) after a defined number ($N_{def}$) of increases of the applied drive torque ($M_{drive}$) to the first torque value (M1), if the blocking of the control valve (2) persists, and to return to the second torque value (M2).

13. The method according to claim 1, wherein the circuit (11) controls the HVAC actuator (1) to repeatedly change the applied drive torque ($M_{drive}$) between the first torque value (M1) and the second torque value (M2) with a first frequency and to modulate the first torque value (M1) between the third torque value (M3) and the fourth torque value (M4) with a second frequency larger than the first frequency.

14. An HVAC actuator (1) for moving a valve member (21) of a control valve (2) to regulate a fluid flow through the control valve (2), the HVAC actuator (1) comprising a circuit (11) configured to:

monitor a rotation angle ($\phi$) associated with a drive torque ($M_{drive}$) applied by the HVAC actuator (1) for moving the valve member (21);

detect a blocking of the control valve (2), if the applied drive torque ($M_{drive}$) effects a change of the rotation angle ($\Delta\phi$) which is smaller than a threshold angle ($\phi_{th}$);

upon detection of the blocking, control the HVAC actuator (1) to repeatedly change the applied drive torque ($M_{drive}$) between a first torque value (M1) and a second torque value (M2) smaller than the first torque value (M1); and to control the HVAC actuator (1) to periodically modulate the first torque value (M1) between a third torque value (M3) and a fourth torque value (M4) smaller than the third torque value (M3).

15. A non-transitory computer-readable medium having stored thereon computer program code which, when executed by a circuit (11) of an HVAC actuator (1), the circuit (11) executes the steps of:

monitoring a rotation angle ($\phi$) associated with a drive torque ($M_{drive}$) applied by the HVAC actuator (1) for moving a valve member (21) of a control valve (2);

detecting a blocking of the control valve (2), if the applied drive torque ($M_{drive}$) effects a change of the rotation angle ($\Delta\phi$) which is smaller than a threshold angle ($\phi_{th}$);

upon detection of the blocking, controlling the HVAC actuator (1) to repeatedly change the applied drive torque between a first torque value (M1) and a second torque value (M2) smaller than the first torque value (M1); and controlling the HVAC actuator (1) to periodically modulate the first torque value (M1) between a third torque value (M3) and a fourth torque value (M4) smaller than the third torque value (M3).

* * * * *